(12) United States Patent
Lech

(10) Patent No.: US 10,380,844 B2
(45) Date of Patent: Aug. 13, 2019

(54) METHOD OF AND SYSTEM FOR GAMING

(71) Applicant: NOVOMATIC AG, Gumpoldskirchen (AT)

(72) Inventor: Janusz Lech, Gumpoldskirchen (AT)

(73) Assignee: NOVOMATIC AG, Gumpoldskichen (AT)

( * ) Notice: Subject to any disclaimer, the term of this patent is extended or adjusted under 35 U.S.C. 154(b) by 455 days.

(21) Appl. No.: 14/916,483

(22) PCT Filed: Sep. 3, 2014

(86) PCT No.: PCT/EP2014/068755
§ 371 (c)(1),
(2) Date: Mar. 3, 2016

(87) PCT Pub. No.: WO2015/032825
PCT Pub. Date: Mar. 12, 2015

(65) Prior Publication Data
US 2016/0196551 A1 Jul. 7, 2016

(30) Foreign Application Priority Data

Sep. 3, 2013 (EP) .................................. 13182895
Feb. 3, 2014 (EP) .................................. 14153728

(51) Int. Cl.
*G06Q 40/08* (2012.01)
*G07F 17/32* (2006.01)
(Continued)

(52) U.S. Cl.
CPC ......... *G07F 17/3251* (2013.01); *G06Q 20/36* (2013.01); *G06Q 20/363* (2013.01);
(Continued)

(58) Field of Classification Search
CPC .................................................. G07F 17/3244
(Continued)

(56) References Cited

U.S. PATENT DOCUMENTS

2002/0160834 A1* 10/2002 Urie ...................... G07F 17/32
463/29
2003/0131265 A1 7/2003 Bhakta
(Continued)

OTHER PUBLICATIONS

M2 Presswire, "US Equity News: No biometric identificaiton on hand held gaming . . . " (Year: 2006).*
(Continued)

*Primary Examiner* — Edward Chang
(74) *Attorney, Agent, or Firm* — Brooks Kushman P.C.

(57) ABSTRACT

A gaming system having a gaming server, and a plurality of user terminals, the gaming server and the gaming machines being connected via a network. The gaming server providing a database to store a plurality of records, each record having an account number as a key value; each of the gaming machines including a biometric interface for requesting a user's biometric data for storing with the account. A system is provided for handling e-wallet cash information of the user. Wherein at least one user terminal is adapted as a cash out terminal to provide cash payout of the users e-wallet to the user upon authentication by way of the biometric interface and the stored biometric data.

12 Claims, 4 Drawing Sheets

(51) Int. Cl.
*G06Q 20/40* (2012.01)
*G06Q 20/36* (2012.01)

(52) U.S. Cl.
CPC ....... *G06Q 20/40145* (2013.01); *G07F 17/32* (2013.01); *G07F 17/323* (2013.01); *G07F 17/3206* (2013.01); *G07F 17/3241* (2013.01)

(58) Field of Classification Search
USPC .......................................................... 705/40
See application file for complete search history.

(56) References Cited

U.S. PATENT DOCUMENTS

| | | |
|---|---|---|
| 2005/0020354 A1 | 1/2005 | Nguyen et al. |
| 2008/0214261 A1 | 9/2008 | Alderucci |
| 2012/0021832 A1 | 1/2012 | Lyons |

OTHER PUBLICATIONS

Business Wire; "Merlin Partners with iView Systems . . . " (Year: 2002).*

International Search Report for PCT/EP2014/068755, Completed by the European Patent Office on Nov. 5, 2014, 4 Pages.

\* cited by examiner

| 31,40 | 42 | 43 | 44 |
|---|---|---|---|
| 151 | 15 | 17:27 | −€30 |
|  | 17 | 19:30 | +€5 |
| 152 | 7 | 18:24 | −€100 |
|  | 12 | 19:17 | +€250 |
|  | 17 | 20:30 | −€30 |
| 153 | 12 | 18:15 | −€700 |
| 154 | 19 | 20:02 | −€50 |
|  | 13 | 22:05 | +€10 |

METHOD OF AND SYSTEM FOR GAMING

CROSS-REFERENCE TO RELATED APPLICATION

This application is the U.S. national phase of PCT Application No. PCT/EP2014/068755 filed on Sep. 03, 2014, which claims priority to EP Patent Application No. 13182895.6 filed on Sep. 03, 2013, and EP Patent Application No. 14153728.2 filed on Feb. 03, 2014, the disclosures of which are incorporated in their entirety by reference herein.

FIELD OF THE INVENTION

The invention relates to a method of and system for operating a gaming machine. More particularly, the present invention relates to systems and methods for cashless gaming operation.

BACKGROUND

Gaming machines, including smart card gaming machines take a myriad of forms. Gaming machines are designed to offer enjoyment, entertainment and pleasure. Some gaming machines offer payouts, which add to the enjoyment of the game.

Transaction of cash on gaming machines needed for operation of the games has also evolved. Where once only coin handling mechanisms were present on gaming machines, credit devices such as cash-out tickets now find wide use. Some casinos issue magnetic player cards that players use to obtain awards for frequent playing. A player holding such a card inserts it into a card reader provided on a gaming machine before play begins. Other casinos issue bar-coded tickets. When a player terminates interaction on a gaming machine, the gaming machine prints a ticket, which visibly indicates the player's final status such as a cash-out value and the time. The player then retrieves the ticket and may redeem it for credit at another game or exchange it for cash at a change booth or a pay machine.

Users of gaming machines could benefit by improving cash handling of such systems.

SUMMARY OF THE INVENTION

This invention provides systems and methods for true cashless gaming experience respectively gaming experience without involving any items to be carried or applied by the user by utilizing biometric user recognition and a single electronic wallet (e-wallet) environment.

According to the invention a gaming system is provided comprising a gaming server, and a plurality of user terminals, the gaming server and the gaming machines being connected via a network; the gaming server providing a database to store a plurality of records, each record having an account number as a key value; each of the gaming machines comprising a biometric interface for requesting a user's biometric data for storing with the account; and means for handling e-wallet cash information of the user; and wherein at least one user terminal is adapted as a cash out terminal to provide cash payout of the users e-wallet to the user upon authentication by means of the biometric interface and the stored biometric data.

Ideally a software program is introduced and stored on the gaming machine, or on a network server, to enable the gaming machine to utilize biometric and e-wallet features. The software program may include firmware.

In one embodiment, the gaming device may also include at least one payment device in communication with the processor. A payment device such as a payment acceptor may include a note, ticket or bill acceptor wherein the player inserts paper money, a ticket, or voucher and a coin slot where the player inserts money, coins, or tokens. In other embodiments, payment devices such as readers or validators for credit cards, debit cards or credit slips may accept payment. In one embodiment, a player may insert an identification card into a card reader of the gaming device wherein the identification card may be a smart card comprising a programmed microchip and a biometric (fingerprint) sensor. In another embodiment, a player may carry a portable device, such as a smart cell phone, or any other suitable wireless device, which may communicate, upon biometric verification of the player, a player's identification, credit totals (or related data), and other relevant information to the gaming device. In one embodiment, money may be transferred to a gaming device through electronic funds transfer. When a player funds the gaming device, the processor may determine the amount of funds entered and may display the corresponding amount on the credit or other suitable display as described above.

In an embodiment this network may be implemented in a so-termed single-wallet-environment including a database for storing e-wallet information and further including interconnected gaming machines, computer terminals at a restaurant or a bar and/or an online or mobile casino.

A software update can adapt various gaming machines to employ the methods of the present invention. It may be necessary to add hardware components to an existing gaming machine. However, a network interface may be introduced to a non-networked gaming machine according to one embodiment of the invention.

Accordingly, one significant benefit of the present invention is to retrofit an existing gaming machine to employ the methods and software of the present invention. Software, as defined herein, includes updatable firmware and programmable code stored on a hard drive, solid-state memory, or other media. Software may be updated en masse via a network server in communication with the gaming machines, or by updating each machine.

The system in accordance with the present invention includes a plurality of gaming machines and a gaming machine server that are networked. The gaming server provides a database to store a plurality of records, each record may have an account number as a key value.

Each of the gaming machines comprises a gaming processor. Each of the gaming machines may comprise a ticket reader and a ticket printer, and a network interface for providing a data connection to the database of the server. The account number is assigned to a user (player).

BRIEF DESCRIPTION OF THE DRAWINGS

Various examples of the invention are explained by reference to the drawings in which.

DETAILED DESCRIPTION

Figure 1:
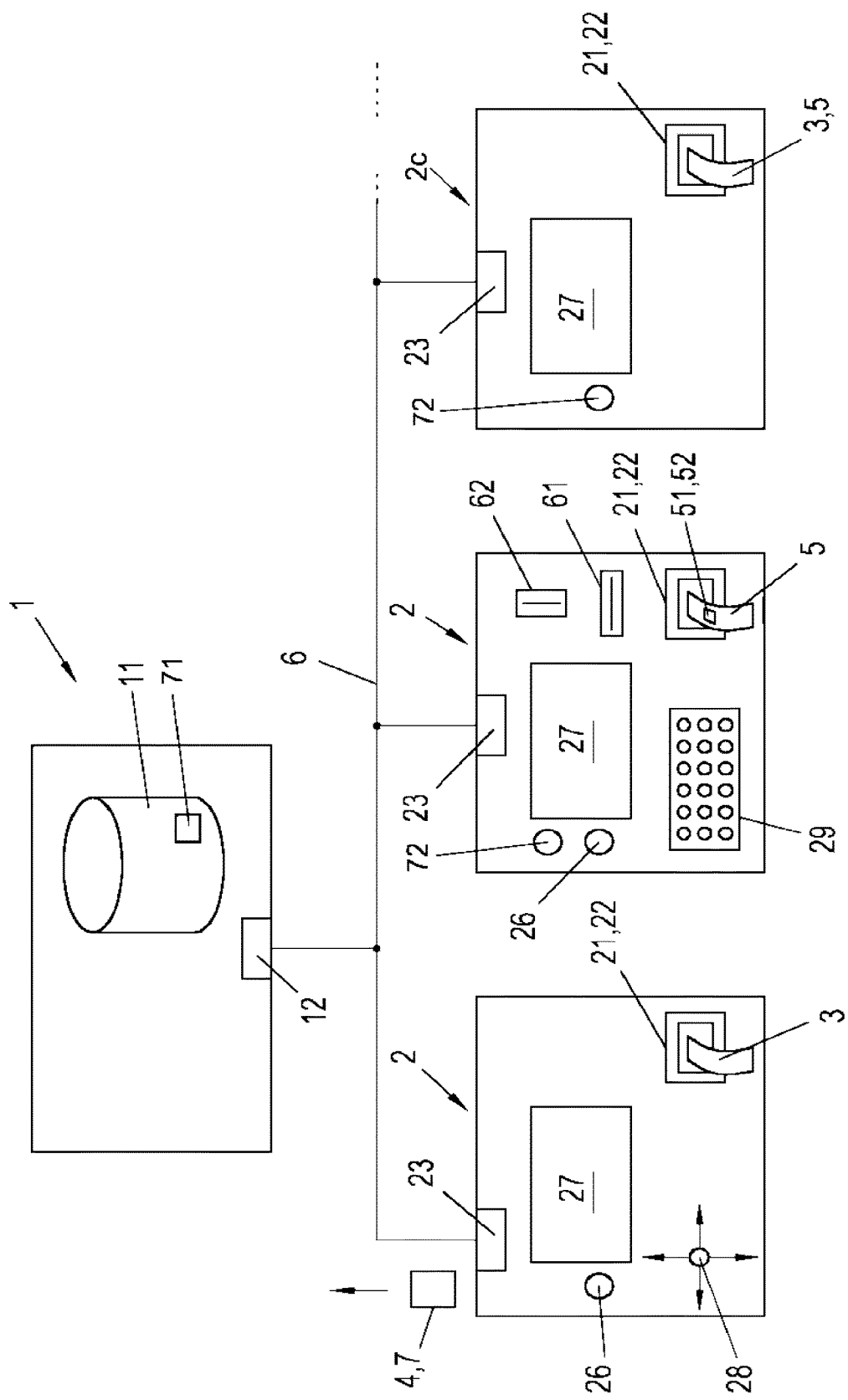
FIG. 1 schematically shows a typical system according to the preferred embodiment of a gaming system.

FIG. 1 schematically shows a preferred example of the invention comprising a server 1 with a database 11 and a plurality of gaming machines 2 and a cash terminal 2c. The database 11 comprises a database area 71 for storing e-wallet information with respect to a user account. The server 1 and the gaming machines 2 and the cash terminal 2c are connected via a computer network 6, wherein the server 1 comprises a network interface 12 and each of the gaming machines 2 and the cash terminal 2c comprises a network interface 23. The cash terminal 2c and each of the gaming machines 2, which are connected to the server 1 via the network 6 comprises a gaming processor 20 (FIG. 2) and gaming peripherals. Each of the gaming machines 2 comprises a display 27 and a cash-out-button 26. The first gaming machine 2, which is shown on the left side of FIG. 1 comprises a single joystick 28, the second gaming machine 2, which is schematically shown in the middle of FIG. 1 comprises a keyboard 29. The keyboard 29 may be physical buttons and/or of a touch screen interface type. The cash terminal 2c, which is shown on the right side of FIG. 1 comprises a biometric sensor 72. Each of the gaming machines 2 further comprises a ticket reader 21 and a ticket printer 22 for reading and printing tickets 3, 5.

Figure 2:
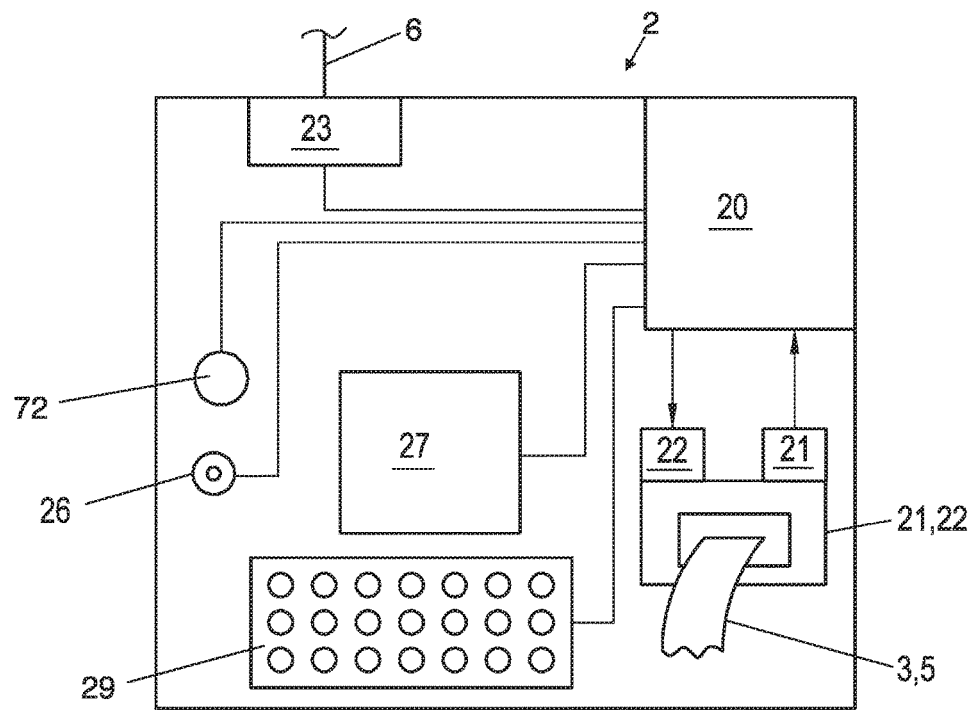
FIG. 2 schematically illustrates the system architecture of a gaming machine.

FIG. 2 schematically shows a gaming machine 2 of FIG. 1 in more detail. The gaming machine 2 shown in FIG. 2 comprises a gaming processor 20, on which a computer program for executing software implementing the respective game on the gaming machine 2 is run. The gaming processor 20 is connected with the peripherals 26, 27, 28, 29 of the gaming machine 2. In this preferred embodiment of a gaming machine 2 the gaming processor 20 is connected to the computer network 6 via network interface 23. The gaming processor 20 is connected to a cash out button 26, a display 27, a keyboard 29 and to a ticket reader 21 and a ticket printer 22 and a biometric sensor 72. With the ticket reader 21 and the ticket printer 22 of this embodiment of the invention it is possible to read in tickets 3, 5 and print tickets 3, 5 with the same device. This device comprises only one slot, into which a ticket 3, 5 can be inserted and by which a printed ticket 3, 5 can be provided, i.e. the slot is shared for the input and output of the tickets.

Figure 3:
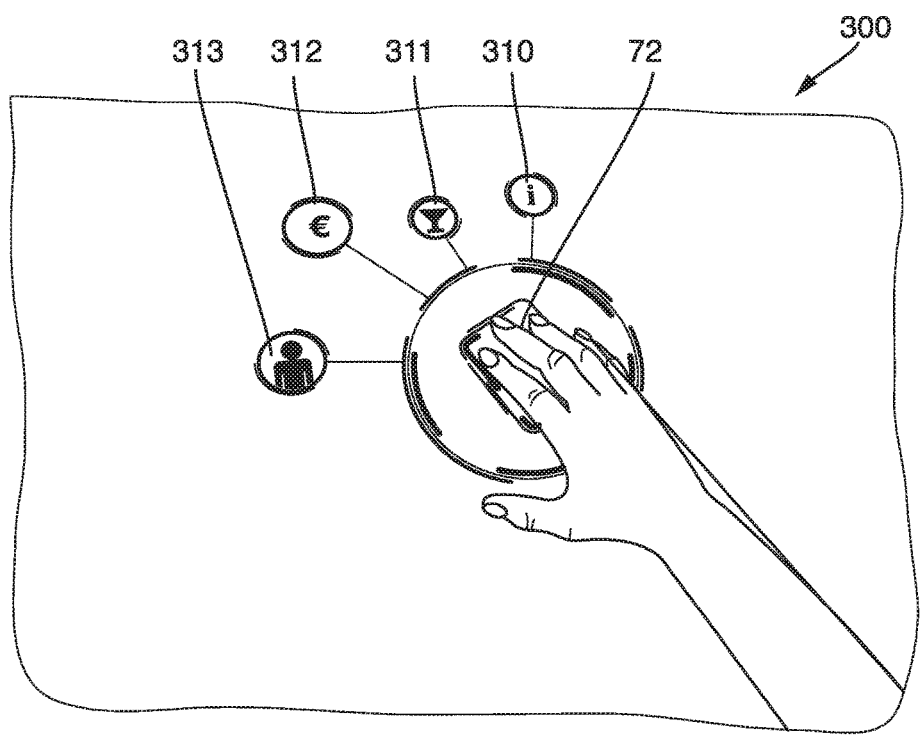
FIG. 3 shows a user interface according to one embodiment of the invention.

FIG. 3 shows a user interface 300 comprising a biometric sensor 72 and an online access touch field 310, a gastro touch field 311, a landbased touch field 312, and a registering touch field 313. The registering touch field 313 enables the user to register with the gaming system, wherein an account is being created for the user and biometric information representative for the user is stored to the database and an e-wallet amount is registered and stored in the account 71 by money transfer using online transfer from a credit card account or by means of the cash handling device of the gaming machine.

Once a guest or patron or user is registered he may login to the gaming system via biometric recognition by means of the biometric sensor 72 to gain access to the e-wallet and gaming area. The user then further may select the gaming machine by means of the landbased access touch field 312. Alternatively the user may gain access to an online gaming platform by means of the online access touch field 310.

In any case, if the amount of cash stored in the e-wallet account 71 is sufficient, the gaming processor 20 starts the game. After the game the cash information account 71 is updated or stored on the cash ticket 5 (by means of e.g. a bar code 51, 52) according to the results of the game. If for example the user wins a game the amount of cash is increased. If however the user loses the game a certain amount of the cash is subtracted from the initial cash information.

In one embodiment, one input device may be a touch-screen coupled with a touch-screen controller or some other touch-sensitive display overlay to allow for player interaction with the images on the display. The touch-screen and the touch-screen controller may be connected to a video controller. A player may make decisions and input signals into the gaming device by touching the touch-screen at the appropriate locations. One such input device may be a conventional touch-screen button panel.

In one embodiment, one input device may be a cash-out button. In one embodiment, the cash-out button may include a biometric input device respectively sensor used in addition to, or in lieu of, any tangible item that the player has or is given to uniquely identify that person. The biometric input device respectively sensor may be a type of, by way of example, and not by way of limitation, fingerprint sensor, handprint sensor, voice recognition, hand writing analysis, facial recognition, retinal scan, DNA scan, thermal scans. Furthermore the biometric device may be able to scan hand veins, i.e. to scan pattern of blood vessels hidden underneath the skin and/or arterial pulse.

In an embodiment, a smart card also has the biometric input device included with the card. Biometric data stored in the card itself is compared with the input from the biometric input device when inserted or connected wirelessly to the card reader for the gaming device client.

The player may push the cash out button to receive, upon approval respectively an enable signal by the biometric sensor, a cash payment or other suitable form of payment corresponding to the number of remaining credits. In one embodiment, when the player cashes out, a payment device, such as a ticket, payment, or note generator prints or otherwise may generate a ticket or credit slip to provide to the player. The player may receive the ticket or credit slip and may redeem the value associated with the ticket or credit slip via a cashier (or other suitable redemption system). In another embodiment, when the player cashes out, the player may receive the coins or tokens in a coin payout tray. It may be appreciated that any suitable payout mechanisms, such as funding to the player's e-wallet or electronically recordable identification card or smart card, may be implemented in accordance with the gaming device or gaming system disclosed herein.

In one embodiment, biometric devices are used in combination with a username and/or password to gain access to a player account.

In another embodiment, the biometric input device (e.g., fingerprint, eye, or image scanner) is part of, or connected to the gaming device, player-tracking unit, or separate device. In one embodiment, the biometric data to which the biometric input is compared is a remote third party trusted biometric registry, such as Verisign (Registered trademark), a bank, or the U.S. or another Government. The input is sent to the trusted registry, along with a user ID, and for example, a password, and the trusted registry sends back an answer as to whether the biometric data matches. Biometric data may be digitally encrypted with a public/private key cryptographic process prior to sending to any remote server. In one embodiment, the biometric data is sent as hash or other encrypted data that uniquely identifies the raw biometric data. In another embodiment, instead of using a third party trusted registry, the casino has its own biometric database.

In another embodiment, a personal computing device includes the biometric reader that compares biometric input against a local biometric database, or a remote biometric registry to approve gaming activity. Further, one embodiment, electronic funds are transferred into the gaming device or gaming server using a secure wallet to allow game wagers or credit purchases to occur.

Biometric information may be beneficial at remote gaming locations and with wireless devices to help with the age and person identification of the player for regulated gaming markets and products. Periodic biometric scans may be required in some embodiments during play of a game to ensure the authorized person is actually playing, and not another substituted person. At registration time a biometric scan takes place for an individual, and the data representative of the biometric scan is to be stored in a secure database associated with the player account. Optionally, user age or birth date is entered into the database so as to create a jurisdictionally compliant gaming system per player and per access point to the system gaming server 140. In one embodiment, this registration takes place at any casino or government approved registration location. Casino personnel or government-approved personnel take the registration data from the player and authenticate the player's various forms of identification. Age and/or biometrics are checked for whether they are associated to the one person. In one embodiment, registration kiosks are used in combination with or alone without extra personnel required in the process.

In order to be able to track the activity of a user of the gaming machine 2 each of the gaming machines 2 is connected to the server 1. The server 1 comprises a database 11. The database 11 provides a respective record 13 for each of the users, wherein each record 13 is uniquely assigned to one of the users of the gaming machine 2. When entering the Casino or before starting to play an account number is assigned to the user.

Before starting a game on the gaming machine 2 the user is invited to log on via the biometric device 72 to the gaming machine 2. The gaming machine 2 may invite the user to provide a cash ticket 5 and to start the game in case if there is no sufficient cash in the respective e-wallet account. Optionally, instead of the cash ticket 5, bills and/or coins may be provided via a bill acceptor 61 and/or coin acceptor 62 of the gaming machine 2 to start the game.

Figures 4, 5:
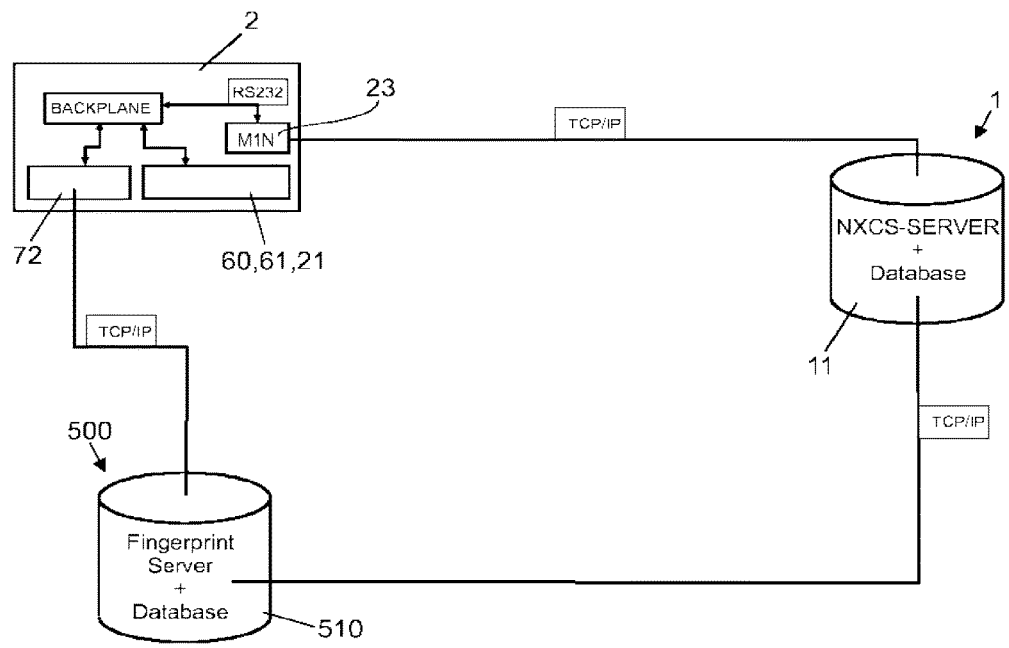
FIG. 4 shows the content of the database which stores the gaming activities of the user.
FIG. 5 shows the network configuration of the gaming system.

FIG. 4 shows by way of example the contents of the database 1 including further gaming information 41. Four users are registered to the system, each with different account numbers and respective records 13. The first user has the account number "151". At 17:27 the first user lost EUR 30, -on a gaming apparatus with an identification number "15", on at 19:30 the same user won EUR 5, -a gaming apparatus with the identification number "17". The lost and won amount (cf. column 44 of FIG. 4) is subtracted respectively added to the amount of the e-wallet (not shown) related to the user account. The e-wallet information may be provided with the same database account or being linked to another database.

In order to avoid manipulations the information exchange on the network may be encrypted.

Even if it is possible to connect personal information of the user, such as name, address, credit card number, telephone number etc. with the account number of the user, the preferred example of the invention avoids linking or connecting such a data in order to maintain the privacy of the user. One or more records 13 exclusively contain the account number and information relating to the games. Personal information may be prohibited to be stored on those records.

FIG. 5 depicts an arrangement of the gaming system in which a gaming machine 2 of the system is in communication with the gaming server 1 (also termed "NXCS"-Server in the present embodiment) based on TCP/IP protocols. It may be mentioned that other protocols may be suited and used, for instance User Datagram Protocol (UDP), Internet Control Message Protocol (ICMP), Hypertext Transfer Protocol (HTTP), Post Office Protocol (POP), File Transfer Protocol (FTP), Internet Message Access Protocol (IMAP), based on wired or wireless connection. The gaming machine 2 comprises the network interface 23, which in the present case is also denoted as "M1N" to indicate a module index. Further gaming devices of the gaming system may comprise respective module index M2N, M3N, . . . MXN. The gaming server 1 comprises the database 11 including the database area 71 for storing e-wallet information with respect to a user account. The gaming system further comprises a biometric server 500 having a biometric database 510. The biometric server 500 may employ extra security precautions to ensure the user's biometric data is protected. The In one embodiment the biometric server 500 is in communication with the biometric sensor 72, which in the present case is the biometric sensor FPS_1 related to the gaming machine 2; the biometric server 500 in turn communicates with the gaming server 1. The gaming system is made more secure as only the biometric device 72 is the only component of the gaming system able to communicate directly with the biometric server 500. Thus, the network interface 23 of the gaming machine 2 cannot access the biometric server 500. User input to the biometric device 72, moreover, is not shared with the remainder of the user terminal 2, thereby preventing the user's biometric data from being shared with any entity other than the trusted biometric server 500.

Figure 6:
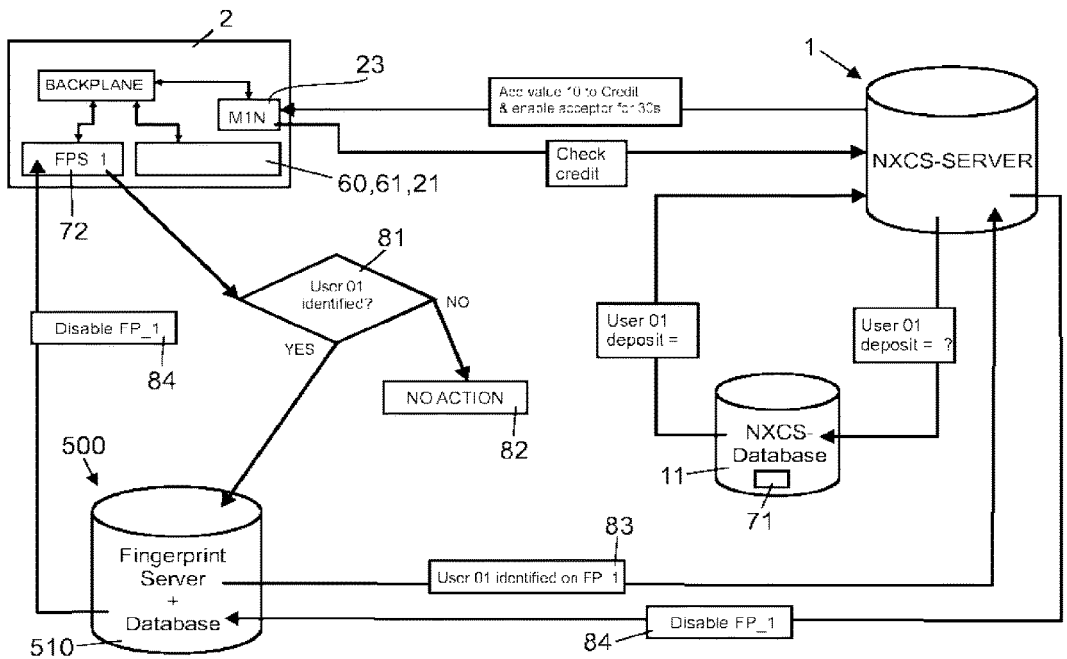
FIG. 6 illustrates the process executed within the network when a user accesses the biometric device.

FIG. 6 depicts which steps the gaming system takes when a user enters his biometric data via the biometric device 72 (respectively the biometric device 72 scans the biometric data of the user). First, this biometric data is verified respectively checked (decision-block 81) against biometric records located in the biometric database 510. The data may be encrypted before being relayed to the biometric server 500. If the biometric server 500 is unable to verify the user's identity, no action is taken (action block 82). However, if the user's identity is verified, i.e. if the user has previously been recorded according to an enrolment procedure, the biometric server 500 sends a user-identification-signal 83 to inform the gaming server 1 that the specific user_01 has accessed the gaming system. The gaming server 1 thereupon will send a disable signal 84 to the biometric server 500 and the biometric server 500 will send a disable signal 84 to the biometric device 72 (FPS_1), which temporarily prevents further access to the biometric device 72 (FPS_1).

Upon learning that the user is present, the gaming server 1 will make the user's account available and complete all necessary transactions and account modifications to correctly maintain the user's account record 13, including his e-wallet. For example, the user can make a deposit via the currency acceptor 61, which will then be credited to the user's account. In one embodiment, the acceptor 61 may unlock only upon communication from the gaming server 1 that a validated user is present. That is, while the biometric device 72 is locked, the acceptor 60 (and/or 61 and/or 21) is unlocked. In another embodiment, the biometric device 72 and the acceptor 61 stay respectively locked and unlocked for a limited period of time, such as thirty seconds. This time period may be extended depending on the user's interactions with the user terminal 2. According to the present example, the customer has € 10.- on the e-wallet account (deposit). In this case the value of 10 € will be transferred from the e-wallet account (deposit) to the credit of the gaming machine 2 and the bank note acceptor of the gaming machine 2 will be unlocked for a time span of forty (40) seconds (acceptor_unlock_time_span=40 s). Each bank note inserted to the acceptor 61 will result in extension of the time span (acceptor_unlock_time_span=current_ acceptor_unlock_time_span+40 s). The acceptor_unlock_time_span is decremented based on a timer clock input (not shown in detail). While the acceptor 61 is unlocked (i.e. activated) the fingerprint scanner is deactivated (locked). After start of a game on the gaming machine 2 the acceptors 60, 61, 21 may be deactivated and the finger print scanner be activated immediately. It may be mentioned that the acceptor_unlock_time_span may be longer, for instance fifty seconds, or shorter, for instance twenty or ten seconds.

Figure 7:
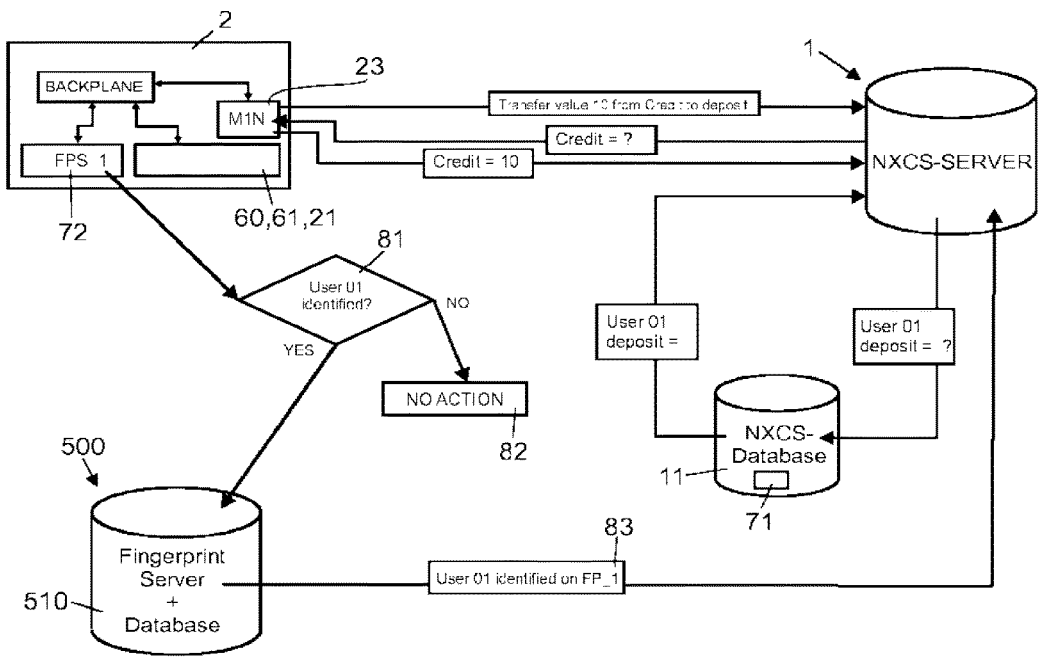
FIG. 7 illustrates further the process executed when a credit is transferred into a user's account.

FIG. 7 shows a further scenario in which the user has a credit on the gaming machine 2, but the e-wallet account record of this user is empty. For instance a credit meter of the gaming machine 2 stores a credit value corresponding to € 10-. The user accesses the biometric device 72 (FPS_1), and the user's biometric data is sent to the biometric server 500, where it is verified (decision-block 81). The biometric server 500 notifies (via user-identification-signal 83) the gaming server 1 that the user is present. Upon learning that the user is present, the gaming server 1 will make the user's account available and check the e-wallet account. If the e-wallet account is empty, then the gaming server 1 will request the credit value of the gaming machine 2. If the credit value on the gaming machine 2 is greater than zero, then the credit value will be transferred from the gaming machine 2 to the e-wallet. In the present case the credit value of € 10.-will be transferred from the gaming machine 2 to the e-wallet.

While the present invention has been described in terms of various examples described in the drawings and the written specification, it can be appreciated that variations in the invention are contemplated herein. The full scope of the present invention is particularly described in the following claims. Also, where the term and/or is used herein, it is meant to have the broadest interpretation and scope of the stated possibilities.

NBS=Novomatic Biometric System
MCM=Mini Cash Master
NCM=Novo Cash Master
FPR=Fingerprint Reader

What is claimed is:

1. A gaming system comprising a gaming server, the gaming server comprising a first database operatively coupled with the gaming server for handling e-wallet cash information of a user; wherein
  the gaming server and a plurality of user terminals are connectable via a network;
  the gaming server provides a first database to store a plurality of e-wallet records, each record having an account number of the user as a key value;
  the gaming system further comprising a biometric data server and a biometric database, wherein the biometric data server is adapted to provide a user-presence-signal to the gaming server,
  each of the user terminals comprises a biometric device that receives and/or stores the user's biometric data; and
  at least one user terminal being adapted as a gaming machine; and
  at least one user terminal provides a cash payout from the user's e-wallet record to the user upon authentication by means of the biometric device and the user's biometric data,
  wherein the biometric device is the only component of the gaming system communicating directly with the biometric data server thereby preventing the user's biometric data from being shared with any entity other than the biometric data server;
  wherein the gaming server, upon receiving the user-presence-signal, is adapted to request a credit value of the gaming machine and the value of the e-wallet; and
  wherein if the credit value is zero and the e-wallet value is greater than zero, then a disable-signal is sent to the biometric data server and/or biometric device.

2. The system according to claim 1, wherein at least one user terminal is a self-service terminal to enable to the user food and/or drink orders within a gastro environment.

3. The system according to claim 1, further comprising a biometric data server having a second database.

4. The system according to claim 3, wherein the biometric data server authenticates the user's biometric data.

5. The system according to claim 4, wherein, upon authentication of the user's biometric data, the biometric device is disabled and the e-wallet account of the user is made accessible to the user terminal.

6. The system according to claim 5, wherein while the biometric device is disabled and an acceptor of the gaming machine is accessible respectively unlocked for a limited time period.

7. The system according to claim 6, wherein the limited time period is extended as a result of a predetermined user action such as banknote, ticket or currency input to the gaming machine.

8. The system according to claim 4, wherein
  the biometric data server is adapted to provide a user-presence-signal to the gaming server.

9. A gaming system comprising a gaming server, the gaming server comprising a first database operatively coupled with the gaming server for handling e-wallet cash information of a user; wherein
  the gaming server and a plurality of user terminals are connectable via a network;
  the gaming server provides a first database to store a plurality of e-wallet records, each record having an account number of the user as a key value;
  the gaming system further comprising a biometric data server and a biometric database, wherein the biometric data server is adapted to provide a user-presence-signal to the gaming server,
  each of the user terminals comprises a biometric device that receives and/or stores the user's biometric data; and
  at least one user terminal being adapted as a gaming machine; and at least one user terminal provides a cash payout from the user's e-wallet record to the user upon authentication by means of the biometric device and the user's biometric data, wherein the biometric device is the only component of the gaming system communicating directly with the biometric data server thereby preventing the user's biometric data from being shared with any entity other than the biometric data server;

wherein, upon authentication of the user's biometric data, the biometric device is disabled, and the e-wallet account of the user is made accessible to the user terminal; and wherein while the biometric device is disabled an acceptor of the gaming machine is accessible respectively unlocked for a limited time period.

10. The system according to claim 9, wherein while the biometric device is disabled and an acceptor of the gaming machine is accessible respectively unlocked for a limited time period.

11. The system according to claim 10, wherein the limited time period is extended as a result of a predetermined user action such as banknote, ticket or currency input to the gaming machine.

12. The system according to claim 9, wherein
the biometric data server is adapted to provide a user-presence-signal to the gaming server; and
the gaming server, upon receiving the user-presence-signal, is adapted to request a credit value of the gaming machine and the value of the e-wallet; and
wherein if the credit value is zero and the e-wallet value is greater than zero, then a disable-signal is sent to the biometric data server and/or biometric device.

* * * * *